(12) United States Patent
Nagaoka et al.

(10) Patent No.: US 8,194,356 B2
(45) Date of Patent: Jun. 5, 2012

(54) HEAD-STACK ASSEMBLY INCLUDING HEAT-DISSIPATION AND IMPEDANCE-MATCHING STRUCTURE AND HARD-DISK DRIVE USING THE HEAD-STACK ASSEMBLY

(75) Inventors: Kazuhiro Nagaoka, Tokyo (JP); Tatemi Ido, Tokyo (JP); Nobumasa Nishiyama, Kanagawa (JP); Yuji Soga, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/644,358

(22) Filed: Dec. 22, 2009

(65) Prior Publication Data
US 2011/0102935 A1 May 5, 2011

(30) Foreign Application Priority Data
Dec. 22, 2008 (JP) ................................ 2008-325688

(51) Int. Cl.
*G11B 5/55* (2006.01)
(52) U.S. Cl. .................... 360/264.4; 360/245.9
(58) Field of Classification Search ........... 360/264.2, 360/266.3, 245.9
See application file for complete search history.

(56) References Cited

U.S. PATENT DOCUMENTS

| 5,949,618 | A | * | 9/1999 | Arya et al. | 360/264.2 |
| 6,025,988 | A | * | 2/2000 | Yan | 361/679.37 |
| 8,045,297 | B2 | * | 10/2011 | Contreras et al. | 360/245.9 |
| 2002/0100609 | A1 | | 8/2002 | Ookawa et al. | |
| 2006/0164761 | A1 | | 7/2006 | Okabe | |

FOREIGN PATENT DOCUMENTS
JP 2007287197 11/2007
* cited by examiner

*Primary Examiner* — Allen Heinz

(57) ABSTRACT

A head-stack assembly. The head-stack assembly includes: a magnetic-recording head; a lead-suspension supporting the magnetic-recording head on an actuator arm; a metal plate coupled with the actuator arm; a resin layer disposed on the metal plate; a flexible-printed-circuit board disposed on the resin layer, and substantially perpendicularly connected to the lead-suspension; a arm-electronics module disposed on the flexible-printed-circuit board configured to shape a write-signal current waveform of a write signal to said magnetic-recording head; transmission lines disposed on the flexible-printed-circuit board configured to transmit the write signal to, and a read-back signal from, the lead-suspension; and, a single intermediate conductor layer that is disposed between the resin layer and the flexible-printed-circuit board, and having a planar shape substantially facing a bottom of the arm-electronics module and a bottom of the transmission lines.

20 Claims, 12 Drawing Sheets

INTERNAL TRANSFER RATE DEPENDENCE OF
TEMPERATURE OF RECORDING/REPRODUCING IC

HEAD-STACK ASSEMBLY INCLUDING HEAT-DISSIPATION AND IMPEDANCE-MATCHING STRUCTURE AND HARD-DISK DRIVE USING THE HEAD-STACK ASSEMBLY

CROSS-REFERENCE TO RELATED APPLICATION

This application claims priority from the Japanese Patent Application No. 2008-325688, filed Dec. 22, 2008, the disclosure of which is incorporated herein in its entirety by reference.

TECHNICAL FIELD

Embodiments of the present invention relate to a head-stack assembly (HSA) and a hard-disk drive (HDD) using the HSA.

BACKGROUND

A HSA used for a HDD includes: a flexible-printed-circuit (FPC) board for transmitting a write signal and read-back signal; an arm-electronics (AE) module, for performing amplification and waveform shaping of a write signal and a read-back signal; a lead-suspension for supporting a magnetic-recording head, and for transmitting a write signal and read-back signal between the AE module and the magnetic-recording head; an actuator arm for supporting such components; and, a coil for rotating the actuator arm for performing positioning of the magnetic-recording head in accessing data on a magnetic-recording disk. In addition, the HSA provides for transmitting the write signal and the read-back signal between the magnetic-recording head and a signal-processing unit, which may be fabricated as a large-scale integrated (LSI) circuit, disposed outside a disk enclosure (DE) of the HDD. As described herein, an AE module may also be referred to as a recording/reproducing integrated circuit (IC); and, a write signal and a read-back signal, may also be referred to as a recording signal and a reproducing signal, respectively.

In addition, as is known in the art, a metal layer may be disposed on the FPC board, which is one of components forming a signal transmission system for transmitting the write signal and the read-back signal, to control characteristic impedance so as to provide characteristic impedance matching between the components of the signal transmission system. Thus, reflection of a signal is reduced, so that degradation of a write signal and read-back signal may be prevented, as is known in the art.

As is also known in the art, a concave portion may be disposed in a surface of a metal plate in contact with an actuator arm, and a convex portion of the FPC board may be disposed in a surface of the actuator arm in contact with the metal plate, so that contact area of the metal plate to the actuator arm is increased. Thus, heat generated by the AE module may be efficiently transferred to the actuator arm, or alternatively, a DE, through the FPC board and the metal plate.

Moreover, as is known in the art, write-signal transmission lines on a lead-suspension may be divided into three blocks; characteristic impedance of each block may be individually set; and, a relationship in magnitudes of characteristic impedances between the blocks may be specified. Thus, a suitable write signal may be obtained by using a reflected wave caused by characteristic impedance mismatching.

Engineers and scientists engaged in HDD manufacturing and development are interested in the design of HDD components, such as, the HSA, that affect signal quality and ultimately affect HDD performance to meet the rising demands of the marketplace for increased reliability and performance.

SUMMARY

Embodiments of the present invention include a head-stack assembly. The head-stack assembly includes: a magnetic-recording head; a lead-suspension supporting the magnetic-recording head on an actuator arm; a metal plate coupled with the actuator arm; a resin layer disposed on the metal plate; a flexible-printed-circuit board disposed on the resin layer, and substantially perpendicularly connected to the lead-suspension; a arm-electronics module disposed on the flexible-printed-circuit board configured to shape a write-signal current waveform of a write signal to said magnetic-recording head; transmission lines disposed on the flexible-printed-circuit board configured to transmit the write signal to, and a read-back signal from, the lead-suspension; and, a single intermediate conductor layer that is disposed between the resin layer and the flexible-printed-circuit board, and having a planar shape substantially facing a bottom of the arm-electronics module and a bottom of the transmission lines.

DESCRIPTION OF THE DRAWINGS

The accompanying drawings, which are incorporated in and form a part of this specification, illustrate embodiments of the invention and, together with the description, serve to explain the embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Figure 16A:
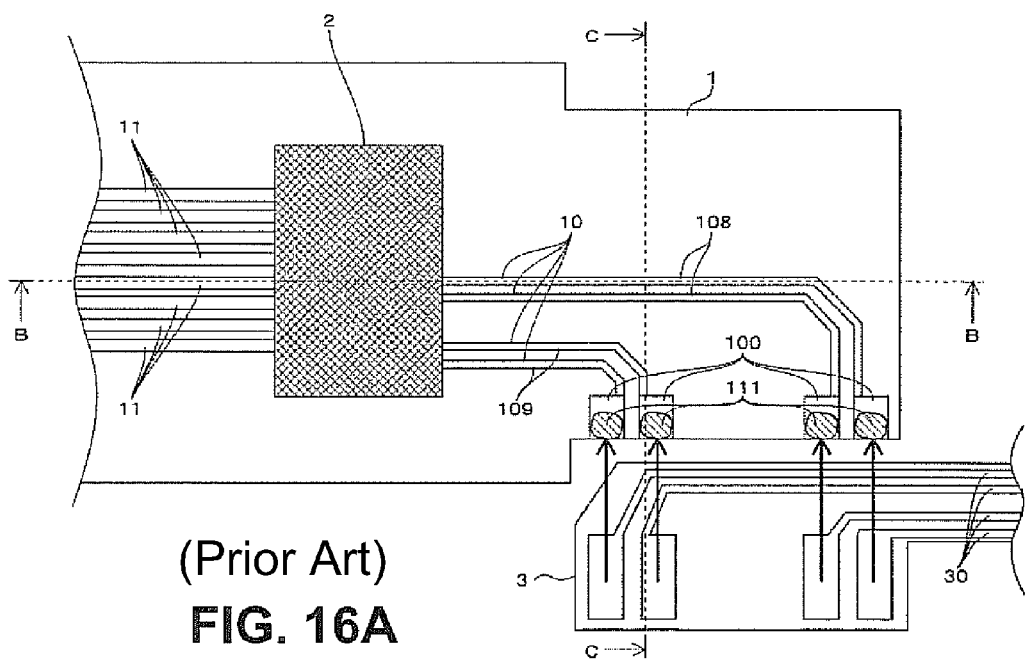
FIG. 16A a plan view of a FPC board connected with a lead-suspension, as previously known in the art.
Figure 16B:
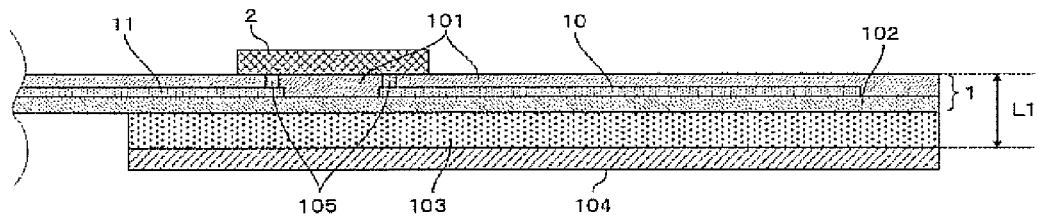
FIG. 16B is a cross-sectional view along line B-B of FIG. 16A of the FPC board of FIG. 16A, as previously known in the art.
Figure 16C:
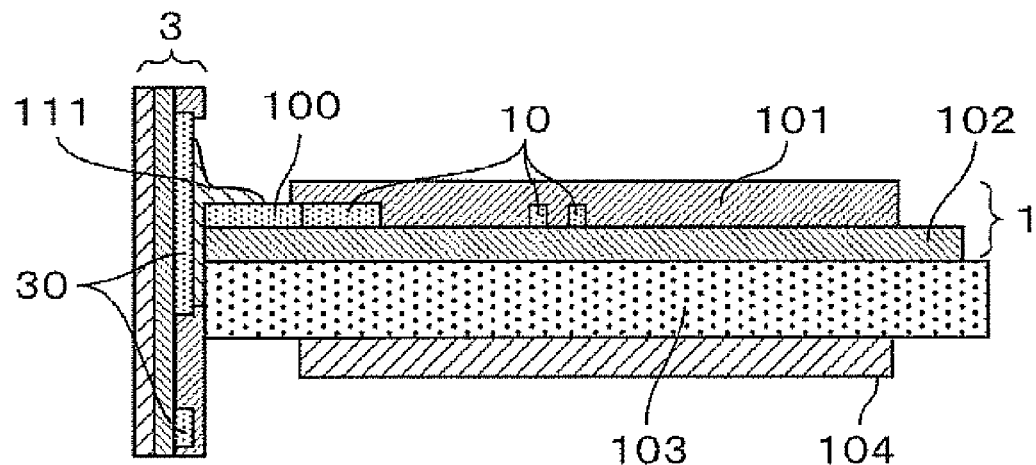
FIG. 16C is a cross-sectional view along line C-C of FIG. 16A of the FPC board connected with the lead-suspension of FIG. 16A after interconnection of the FPC board with the lead-suspension, as previously known in the art.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary. Description of Embodiments of the Present Invention for a Head-Stack Assembly Including a Heat-Dissipation and Impedance-Matching Structure and a Hard-Disk Drive Using the Head-Stack Assembly With reference now to FIGS. 16A, 16B and 16C, as is known in the art and with relevance to embodiments of the present invention, an example of a structure of flexible-printed-circuit (FPC) board 1 is shown; in FIG. 16A, a plan view of FPC board 1 connected with a lead-suspension 3 is shown; in FIG. 16B, a cross-sectional view along line B-B of FIG. 16A of FPC board 1 of FIG. 16A is shown; and, in FIG. 16C, a cross-sectional view along line C-C of FIG. 16A is shown of FPC board 1 connected with the lead-suspension 3 of FIG. 16A after interconnection of FPC board 1 with the lead-suspension 3. In FIGS. 16A-16C, FPC board 1 is mounted with an arm-electronics (AE) module 2, also referred to herein as a recording/reproducing integrated circuit (IC), by flip-chip bonding; FPC board 1 includes: transmission lines 10 for transmitting a write signal and read-back signal, also referred to herein as a recording signal and reproducing signal, respectively, between AE module 2 and the lead-suspension 3; and, transmission lines 11 for transmitting a write signal and read-back signal between AE module 2 and a signal-processing unit (not shown), and for transmitting a drive signal of AE module 2. FPC board 1 is affixed to a side face of an arm carriage (not shown) by fastening means (not shown), such as, screws. Thick arrows show connection of FPC board 1 mounted with AE module 2 to the lead-suspension 3 mounted with a magnetic-recording head (not shown). The transmission lines 10 include write-signal and read-back-signal transmission lines 10 on FPC board 1 including write-signal transmission lines 108 and read-back-signal transmission lines 109. In FIGS. 16A-16C, the following are also shown: connection terminals 100 of the transmission lines 10, a cover insulating layer 101, a base insulating layer 102, a resin layer 103, and a metal plate 104. AE module 2 is connected to the write-signal and read-back-signal transmission lines 10 and transmission lines 11 via solder bumps 105. Write-signal and read-back-signal transmission lines 30 on the lead-suspension 3 are connected by solder 111 at one end to a signal terminal of the magnetic-recording head, and connected at the other end to connection terminals 100 on an end face of transmission lines 10 on FPC board 1. This results in a configuration where transmission of the write signal and read-back signal between AE module 2 and the magnetic-recording head is made through the transmission lines 10 on FPC board 1 and the transmission lines 30 on the lead-suspension 3. A metal plate 104 is attached at connection portions of FPC board 1 to the arm carriage (not shown) and to the lead-suspension 3 in order to prevent variation in connection position due to warpage of FPC board 1, as FPC board 1 is flexible, or alternatively, due to fluctuation of FPC board 1 due to air-flow induced by rotation of a magnetic-recording disk.

With the advance of hard-disk-drive (HDD) technology, HDDs have acquired increased storage capacity, and accordingly increased internal data-transfer rates, which raises issues of degradation of the write signal and the read-back signal due to increased speeds of signal propagation attending such increased internal data-transfer rates. This is caused by the following two reasons, as are next described.

First, a write signal and read-back signal may be reflected due to characteristic impedance mismatching between components forming the signal transmission system including signal transmission systems 10 and 30 for transmitting the write signal and read-back signal between AE module 2 and the magnetic-recording head, so that the write signal and read-back signal may become degraded. Reflection of a signal due to characteristic impedance mismatching in the signal transmission system is more pronounced with increased speed of the signal, so that the signal is further degraded. As is known in the art, a metal layer may be additionally disposed on FPC board 1, which is one of the components forming the signal transmission system, to control characteristic impedance, so as to provide characteristic impedance matching between the components. Thus, reflection of a signal may be reduced; and, consequently degradation of a write signal and read-back signal may be prevented.

Second, power consumption of AE module 2 may be increased due to increased speed of a signal; and, a quantity of heat generated by AE module 2 is accordingly increased, so that temperature of AE module 2 is increased; and, consequently performance of AE module 2 is reduced. As is also known in the art, a concave portion may be disposed in a surface of a metal plate in contact with an actuator arm; and, a convex portion of FPC board 1 may be disposed in a surface of an actuator arm in contact with the metal plate, so that contact area of the metal plate to the actuator arm is increased. Thus, heat generated by AE module 2 is efficiently transferred to the actuator arm, or alternatively, a disk enclosure (DE) through FPC board 1 and the metal plate.

Moreover, as is also known in the art, write-signal transmission lines on a lead-suspension may be divided into three blocks; characteristic impedance of each block may be individually set; and, relationship in magnitudes of characteristic impedances between the blocks may be specified. Thus, a suitable write signal may be obtained by using a reflected wave due to characteristic impedance mismatching.

As described above, the HDD may have increased internal data-transfer rate, namely, to increase speed of a write signal and read-back signal. Upon considering both the write signal and read-back signal, the write signal may have increased speed compared with the internal data-transfer rate, or compared with a read-back signal, because the write signal induces complete reversal of magnetization of a magnetic-recording disk within unit bit time. Thus, signal degradation most significantly occurs in the highest-speed write signal due to the degradation of the write signal caused by increase in speed of the internal data-transfer rate. In addition, the quantity of heat generated by the AE module may be greatly increased due to a reduction in performance caused by large numbers of switching reversals during recording operations in the AE module with correspondingly increased power consumption.

Thus, for increasing speed of the internal data-transfer rate, degradation of a write signal is reduced during transmitting the signal; and, a structure, in which heat generated during operation of the AE module is effectively dissipated, is provided. Furthermore, the HSA may be structured such that heat for solder connection of the FPC board to a lead-suspension is not dissipated from the solder connection portion of the FPC board, so that an HSA is provided in which the FPC board is perpendicularly connected to the lead-suspension.

As is known in the art, a periphery of the solder may be filled with polyimide so as to prevent dissipation of heat from the solder to the periphery during solder jointing. Under these circumstances, operation speed of an AE module was not very high, and heat transfer from a semiconductor chip included in the AE module was not very high; therefore, heat was able to be adequately dissipated from the AE module even if polyimide was present around the periphery of the solder. However, with the advance of HDD technology, the speed of an AE module has progressively increased, so that heat dissipation from the AE module may no longer be adequate in a configuration where the periphery of the solder is filled with polyimide. Thus, the inventors of embodiments of the present invention considered a design in which a conductor, for example, metal plate, was inserted in an upper layer portion of polyimide to ensure heat transfer away from the AE module. However, when the conductor is inserted in the upper layer portion of polyimide, since the portion is close to a solder joint in the configuration previously known in the art, heat provided to solder is also dissipated via the conductor, which is opposed to the effect of preventing heat dissipation during solder jointing.

However, the inventors of embodiments of the present invention investigated configurations in which the conductor was disposed in the upper layer portion of the polyimide. As a result, the inventors have found a configuration for the conductor in which a positional relationship between the conductor, the AE module, and the solder joint was devised such that, even if the conductor was disposed in the upper layer portion of polyimide, sufficient heat dissipation from the AE module was able to be obtained.

Embodiments of the present invention provide a head-stack assembly (HSA), which reduces degradation of a write signal transmitted to a magnetic-recording head, and degradation in performance of the AE module due to increased temperature of the AE module. Thus, embodiments of the present invention are suitable for high data-transfer rate in a HDD using the HSA.

In accordance with embodiments of the present invention, a HSA includes: a magnetic-recording head; a lead-suspension supporting the magnetic-recording head on an actuator arm; a metal plate coupled with the actuator arm; a resin layer disposed on the metal plate; a FPC board that is disposed on the resin layer, and substantially perpendicularly connected to the lead-suspension; an AE module disposed on the FPC board to shape a write-signal current waveform of a write signal to the magnetic-recording head within the HDD; transmission lines disposed on the flexible-printed-circuit board to transmit the write signal to, and a read-back signal from, the lead-suspension; and, a single intermediate conductor layer that is disposed between the resin layer and the FPC board, and having a planar shape substantially facing a bottom of the AE module and a bottom of the transmission lines.

In accordance with embodiments of the present invention, a HSA is provided that is configured to reduce degradation of a write signal transmitted to a magnetic-recording head, and degradation in performance of AE module due to an increase in temperature of AE module. Thus In accordance with embodiments of the present invention, the HSA is suitable for high data-transfer rate in a HDD using the HSA.

Embodiments of the present invention provide a FPC-board structure of the HSA such that the FPC board is perpendicularly connected to a lead-suspension, so that: the heat for soldering the connection of the FPC board to the lead-suspension is not dissipated from a solder connection portion of the FPC board; heat generated during operation of the AE module is dissipated and transferred away from the AE module; degradation of a write signal is prevented during high speed transmission of a write signal; and, a HSA is provided that is suitable for a high internal data-transfer rate. In accordance with embodiments of the present invention, an intermediate conductor layer is additionally disposed between a resin layer disposed on a side of the FPC board facing an actuator arm and the FPC board near a portion at which the FPC board mounted with the AE module is coupled with the actuator arm; the intermediate conductor layer has: an area larger than an area of the AE module, a width equal to or larger than a width of the write-signal transmission lines, and is located far from connection terminals of the FPC board to the lead-suspension compared with a distance from the connection terminals to the metal plate.

In accordance with embodiments of the present invention, a intermediate conductor layer is provided: which affects the characteristic impedance of a write-signal transmission lines on the FPC board for transmitting a write signal between the AE module and the lead-suspension; which enables control of the characteristic impedance of the write-signal transmission lines on the FPC board; and, in turn, which enables matching between output impedance of a write circuit in the AE module and characteristic impedance of the write-signal transmission lines on the lead-suspension, so that a reflected wave due to characteristic impedance mismatching may be reduced even in high speed transmission of a write signal. Moreover, in accordance with embodiments of the present invention, heat generated by the AE module may be diffused to the intermediate conductor layer disposed near the AE module by thickness of the resin layer compared with the metal plate; the heat diffused to the intermediate conductor layer may be transferred to the metal plate, the actuator arm, and a DE with a transfer area larger than area of the AE module; and, consequently, a heat dissipation and transference away from the AE module is increased so that an increase in temperature of the AE module may be reduced. Furthermore, in accordance with embodiments of the present invention, the intermediate conductor layer is far from a solder connection portion of the FPC board to the lead-suspension compared with a distance between the connection terminals and the metal plate, which prevents reduction in the amount of heat available during solder connection due to heat leakage away from the connection terminals; and thus, a solder connection of the FPC board to the lead-suspension may be performed, providing an HSA including a structure in which the FPC board is perpendicularly connected to the lead-suspension.

Embodiments of the present invention are subsequently described by way of various examples. In the description of these examples with attending figures, when the FPC board is assumed as a reference, a direction of the AE module is shown as an upward direction in a figure, and a direction of an actuator arm is shown as a downward direction in a figure. The first example is described using FIGS. 1 to 10. A general configuration of a HSA of a HDD and a general configuration of the HDD are next described using FIGS. 1 and 2.

EXAMPLE 1

Figure 1:
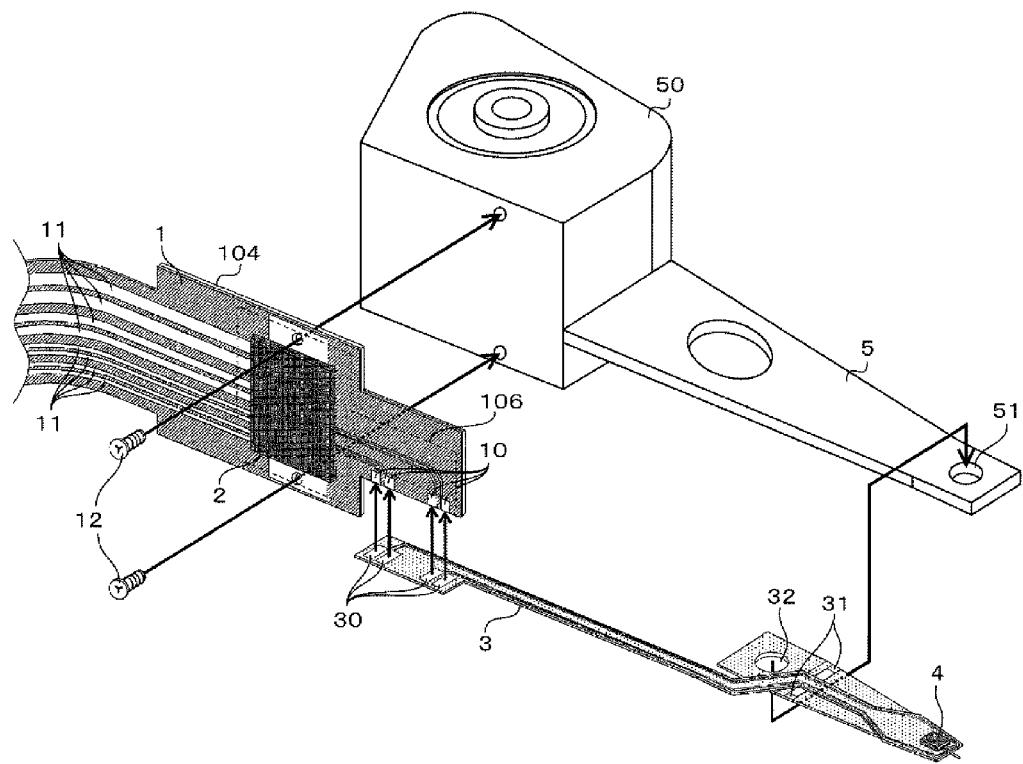
FIG. 1 is an exploded perspective view for illustrating a configuration and an assembled condition of a head-stack assembly (HSA) of a first example, in accordance with an embodiment of the present invention.
Figure 2:
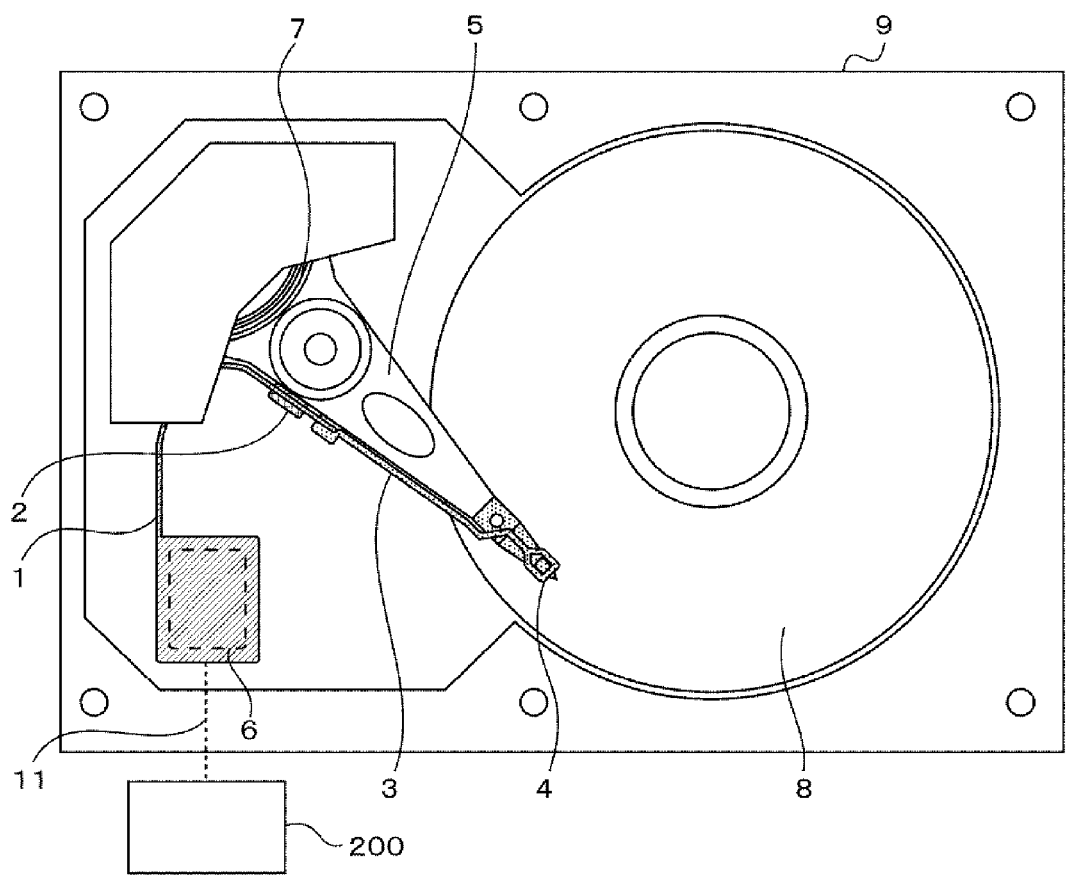
FIG. 2 is a plan view showing a general configuration of a hard-disk drive (HDD) of the first example, in accordance with an embodiment of the present invention.

With reference now to FIGS. 1 and 2, in accordance with embodiments of the present invention, in FIG. 1, an exploded perspective view is shown that shows a configuration and an assembled condition of a HSA of a first example; and, in FIG. 2, a plan view is shown that shows a general configuration of the HDD including the HSA of the first example. The HSA includes: FPC board 1, which is flexible, for transmitting a write signal and read-back signal; an AE module 2 that performs amplification, or alternatively, waveform shaping of a write signal and a read-back signal; a lead-suspension 3 for transmitting the write signal and read-back signal between AE module 2 and a magnetic-recording head 4 while supporting the magnetic-recording head 4; an actuator arm 5 supporting such components; and, a coil 7 that is configured to rotate the actuator arm 5 for performing positioning of the magnetic-recording head 4. The following components are also shown in FIG. 2: a connector 6, a magnetic-recording disk 8, and a DE 9 of the HDD.

FPC board 1, which is mounted with AE module 2 by flip-chip bonding, includes: transmission lines 10 for transmitting the write signal and the read-back signal between the AE module 2 and the lead-suspension 3; and, transmission lines 11 for transmitting the write signal and the read-back signal between AE module 2 and signal-processing unit 200, which is disposed outside of the DE, and for transmitting a drive signal of AE module 2. The FPC board 1 is affixed to a side face of an arm carriage 50 by fastening means such as screws 12. The HSA is structured such that the FPC board 1 is substantially perpendicularly connected to the lead-suspension 3.

The lead-suspension 3 including a suspension 31, which is mounted with the magnetic-recording head 4 on an end of the suspension 31, is connected to a connection portion 51 on an arm at a connection portion 32; and, thus, the lead-suspension 3 is affixed to the actuator arm 5. Transmission lines 30 on the lead-suspension 3 are connected at one end to signal terminals of the magnetic-recording head 4, and connected at the other end to an end face of the transmission lines 10 on FPC board 1. This results in a configuration where transmission of the write signal and the read-back signal between AE module 2 and the magnetic-recording head 4 is made through the transmission lines 10 on FPC board 1 and the transmission lines 30 on the lead-suspension 3. A metal plate 104, which is third conductor layer, is attached to connection portions of FPC board 1 to the arm carriage 50 and to the lead-suspension 3 in order to prevent variation in connection position due to warpage of FPC board 1, which is flexible, or alternatively, fluctuation of FPC board 1 due to air-flow induced by rotation of the magnetic-recording disk.

Figure 3A:
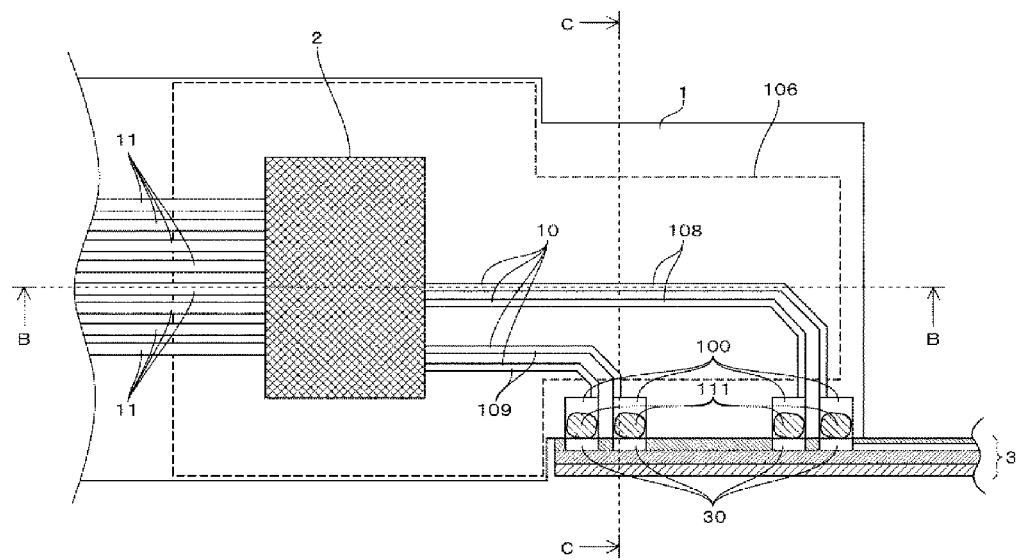
FIG. 3A is a plan view of a flexible-printed-circuit (FPC) board connected with a lead-suspension of the first example, in accordance with an embodiment of the present invention.
Figure 3B:
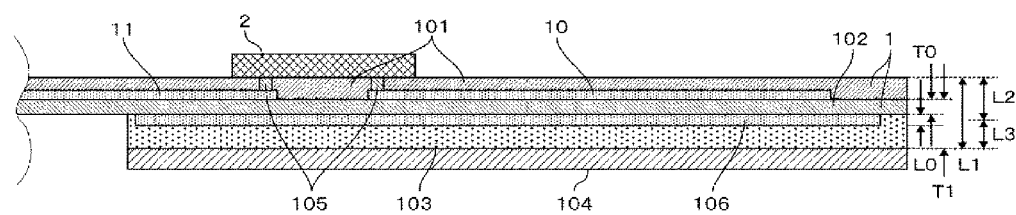
FIG. 3B is a cross-sectional view along line B-B of FIG. 3A of the FPC board of the first example, in accordance with an embodiment of the present invention.

A member shown by a broken line in FIG. 1 is an intermediate conductor layer 106, which is second conductor layer, additionally disposed between FPC board 1 and a resin layer (not shown, see FIG. 3B). The intermediate conductor layer 106 has a large area compared with AE module 2 in a planar shape, and furthermore, has a width and a length at least equal to, or larger than, the combined widths of the transmission lines 10. Material of the intermediate conductor layer 106 possesses high electrical conductivity and high thermal conductivity, adequate mechanical strength, and high flexibility. Specifically, copper, or alternatively, rolled copper, is suitable as a material for such an intermediate conductor layer 106.

In FIG. 1, thick arrows show a relationship between respective connection positions of FPC board 1 mounted with AE module 2, the actuator arm 5, and the lead-suspension 3 mounted with a magnetic-recording head 4.

Figure 3C:
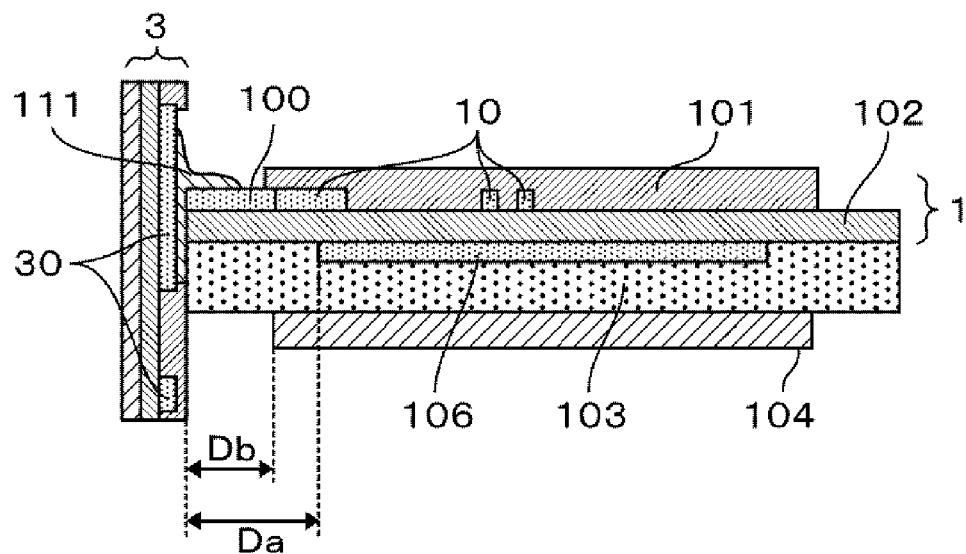
FIG. 3C is a cross-sectional view along line C-C of FIG. 3A of the FPC board connected with the lead-suspension of the first example, in accordance with an embodiment of the present invention.

With reference now to FIGS. 3A, 3B and 3C, in accordance with embodiments of the present invention, a more specific configuration of FPC board 1 is described. In FIG. 3A, a plan view is shown of the top of FPC board 1, in which the lead-suspension 3 is substantially perpendicularly connected to an end face of FPC board 1. The transmission lines 30 on the lead-suspension 3 are connected by solder 111 to connection terminals 100 disposed on an end face of the transmission lines 10 on FPC board 1. FPC board 1 mounted with AE module 2 is coupled with actuator arm 5 being affixed to a side face of the arm carriage 50 to which the actuator arm 5 is also attached (refer to FIG. 1). Transmission lines 11 is used for transmitting the write signal and the read-back signal between the signal-processing unit 200 (refer to FIG. 2) disposed outside the DE 9 of the HDD and AE module 2, and for transmitting a drive signal of AE module 2. The transmission lines 10 are used for transmitting the write signal and the read-back signal between AE module 2 and the lead-suspension 3. Furthermore, the transmission lines 10 include write-signal transmission lines 108 for transmitting a write signal, and read-back-signal transmission lines 109 for transmitting a read-back signal, each of which includes at least one pair of lines, which is included in a first conductor layer. FIG. 3A shows a case where the write-signal transmission lines 108 and the read-back-signal transmission lines 109 include two lines respectively, and the write signal or the read-back signal is transmitted as a differential signal.

The intermediate conductor layer 106, which is a second conductor layer, including a metal layer, is disposed such that the intermediate conductor layer 106 covers the whole bottom of the transmission lines 10, which are the write-signal transmission lines 108 and read-back-signal transmission lines 109, the whole bottom of AE module 2 and the whole periphery of the bottom of AE module 2.

For example, the dimensions of the write-signal transmission lines 108 are given as follows: 60 micrometers (μm) in width for each line of the pair; separated by a space of 50 μm between the two lines of the pair; and, 10 millimeters (mm) in length individually for each line of the pair. Similarly, the dimensions of the read-back-signal transmission lines 109 are given as follows: 60 μm in width for each line of the pair; separated by a space of 50 μm between the two lines of the pair; and, 6 mm in length individually for each line of the pair. The connection terminals 100 are disposed on connection end faces to the lead-suspension 3 at an end of the transmission lines 10, and each connection terminal 100 has a size of 300 μm×600 μm.

The number of the lead-suspensions to be connected to FPC board 1 may be two or more; and, the number of the write-signal transmission lines 108, the number of the read-back-signal transmission lines 109, and the number of connection terminals 100 may be increased depending on the number of the lead-suspensions and the number of magnetic-recording heads that are mounted on the lead-suspensions, respectively.

With reference now to FIG. 3B, in accordance with an embodiment of the present invention, a cross-sectional view along line B-B of FIG. 3A of FPC board 1 is shown. According to FIG. 3B, the first conductor layer, namely, the transmission lines 10 and the transmission lines 11, each line including rolled copper 18 μm in thickness, are disposed on a base insulating layer 102, which is first insulating layer, including polyimide having a thickness ($T_0$) of 12.5 μm; and, a cover insulating layer 101, which is second insulating layer, including polyimide having a thickness of 12.5 μm, is disposed on the transmission lines 10 and the transmission lines 11 so as to cover the transmission lines 10 and the transmission lines 11. Thus, FPC board 1 is configured to be flexible. AE module 2 is mounted on a top of FPC board 1 by flip-chip mounting in such a manner that AE module 2 is connected to the transmission lines 10 and the transmission lines 11 by solder bumps 105. AE module 2 is affixed at a back of AE module 2 to the cover insulating layer 101. In a fastening portion of FPC board 1 that is fastened to the arm carriage 50 (refer to FIG. 1) and in a connection portion of FPC board 1 that is connected to the lead-suspension 3, a resin layer 103, which is third insulating layer, including polyimide, or similar material, having a thickness ($L_3$) of 50 μm, is attached to a bottom of the FPC board 1; and, in addition, a metal plate 104, which is third conductor layer, including aluminum 300 μm in thickness, is attached to a bottom of the resin layer 103. An adhesive (not shown) 5 to 40 μm in thickness is used for adhesion between the layers. In accordance with an embodiment of the present invention, the intermediate conductor layer 106 is disposed between FPC board 1 and the resin layer 103 with a sufficiently large size to cover a bottom of AE module 2 and a bottom of the transmission lines 10, which is a portion of the first conductor layer. Copper, or alternatively, rolled copper, is a suitable material for the intermediate conductor layer 106; and, a thickness ($L_0$) of the intermediate conductor layer 106 is at least 5 μm, or more. $L_1$ is a distance between AE module 2 and the metal plate 104; $L_2$ is a distance between AE module 2 and the intermediate conductor layer 106; and, $L_3$ is a distance between the intermediate conductor layer 106 and the metal plate 104, respectively. According to the first example, a distance between the first conductor layer 10 and the intermediate conductor layer 106, in other words, the thickness ($T_0$) of the base insulating layer 102 on FPC board 1 is extremely small compared with a distance ($T_1$) between the first conductor layer 10 and the metal plate 104. $T_0$ is ¼ of $T_1$ at most. This configuration controls the characteristic impedance of the write-signal transmission lines 108 on FPC board 1, and reduces the characteristic impedance of the transmission lines 10.

With reference now to FIG. 3C, in accordance with embodiments of the present invention, a cross-sectional view along line C-C of FIG. 3A of FPC board 1 connected with the lead-suspension 3 is shown. According to FIG. 3C, at the connection portion of FPC board 1 to the lead-suspension 3, a space (Db) of 380 μm is provided from a connection end face, which is an end face of the lead-suspension 3 side, of FPC board 1 to the lead-suspension 3 to an end face of the metal plate 104. The space (Db) is provided for reducing heat dissipation via the metal plate 104, because the heat is used for solder connection of the connection terminals 100 on FPC board 1 to the lead-suspension 3. The intermediate conductor layer 106 is disposed inwardly with a space of at least 400 μm from the connection end face, which are connection terminals 100, of FPC board 1 to the lead-suspension 3. Thus, as shown in FIG. 3B, a distance Da from the connection end face on the lead-suspension 3 side to an end of the intermediate conductor layer 106 is at least 400 μm, or more, being larger than the space Db.

Moreover, the distance Da from a connection point 100 of FPC board 1 to the lead-suspension 3 to the intermediate conductor layer 106 is longer than the distance, which is space Db, from the connection point to the metal plate 104. Furthermore, the distance Db from the connection end face of the lead-suspension 3 to the metal plate 104 is longer than the distance L1 between AE module 2 and the metal plate 104.

Figure 4:
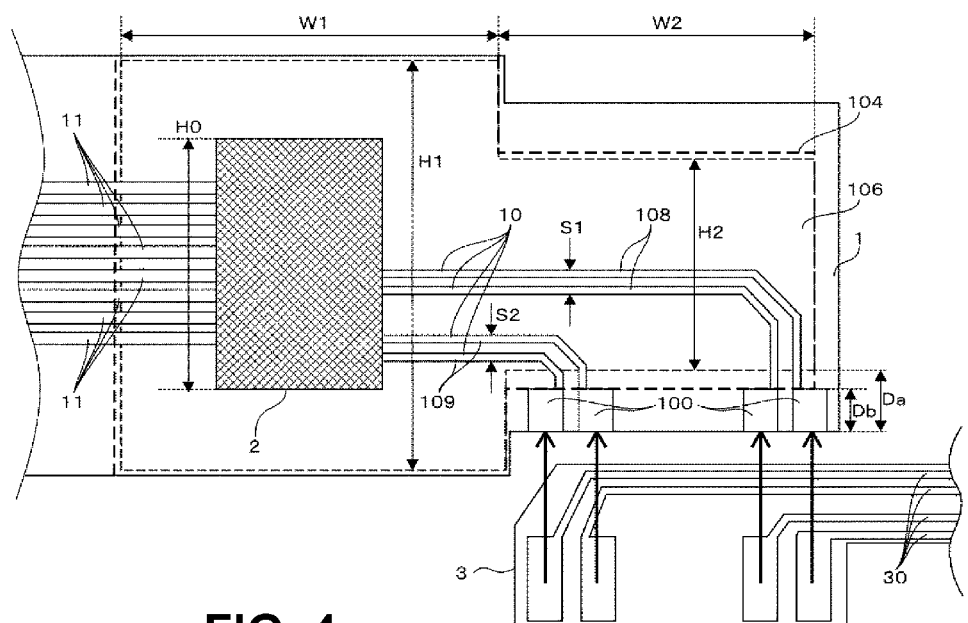
FIG. 4 is a plan view for illustrating a shape and a manufacturing method of the FPC board of the first example, in accordance with an embodiment of the present invention.

With reference now to FIG. 4, in accordance with an embodiment of the present invention, a plan view is shown that illustrates a shape and a manufacturing method of FPC board 1. As shown by arrows in FIG. 4, the transmission lines 30 on the lead-suspension 3 are connected by solder to the connection terminals 100 disposed on the end face of the transmission lines 10 on FPC board 1.

Moreover, as shown in FIG. 4, an area of a bottom, which is determined by height H1, of the intermediate conductor layer 106 located below AE module 2 is larger than an area of a bottom, which is determined by height H0, of the circuit 2. A width, which is given by height H2, of the intermediate conductor layer 106 located below the transmission lines 10 is equal to or larger than a width, which is S1+S2, of the transmission lines. Furthermore, the intermediate conductor layer 106 and the metal plate 104 have approximately the same size in a planar shape, except for a difference between the distance Da from the connection terminals 100 near the connection end face and length of the space Db.

In FPC board 1 including the above structure, characteristic impedance of the write-signal transmission lines 108 was 60 ohms (Ω).

When such a FPC board, as FPC board 1, is used, an amount of lost heat due to heat dissipation during manufacturing of the HSA, as heat is used for solder connection of FPC board 1 to the lead-suspension 3, is of the same order as heat transferred from the connection terminals to the metal plate 104 in FPC board 1 including the structure of FIG. 16, previously known in the art; and, consequently, solder connection of FPC board 1 to the lead-suspension 3 may be made in the same fashion as previously known in the art.

The quantity of heat generated by a preamp is increased with increase in speed of the preamp as described above. The first example provides for increasing the amount of heat dissipation and transfer from AE module 2, which is next described with reference to FIGS. 5 and 6.

Figure 5:
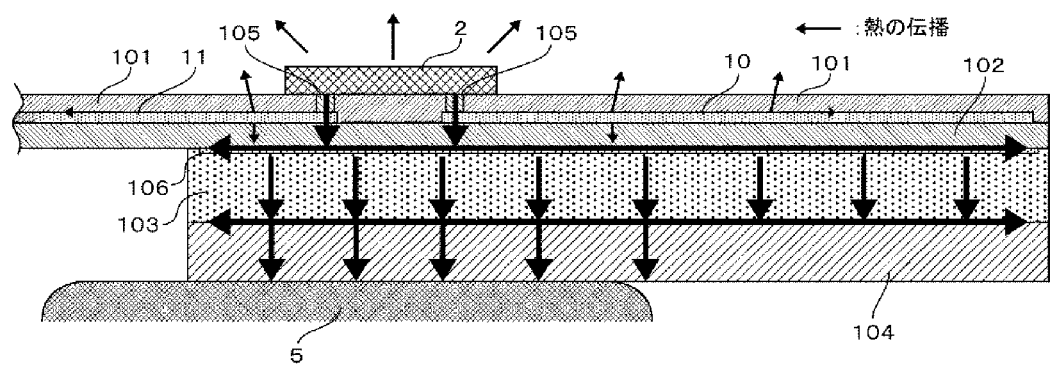
FIG. 5 is a cross-sectional view showing heat transfer within, and thermal radiation from, the HSA of the first example, in accordance with an embodiment of the present invention.
Figure 6:
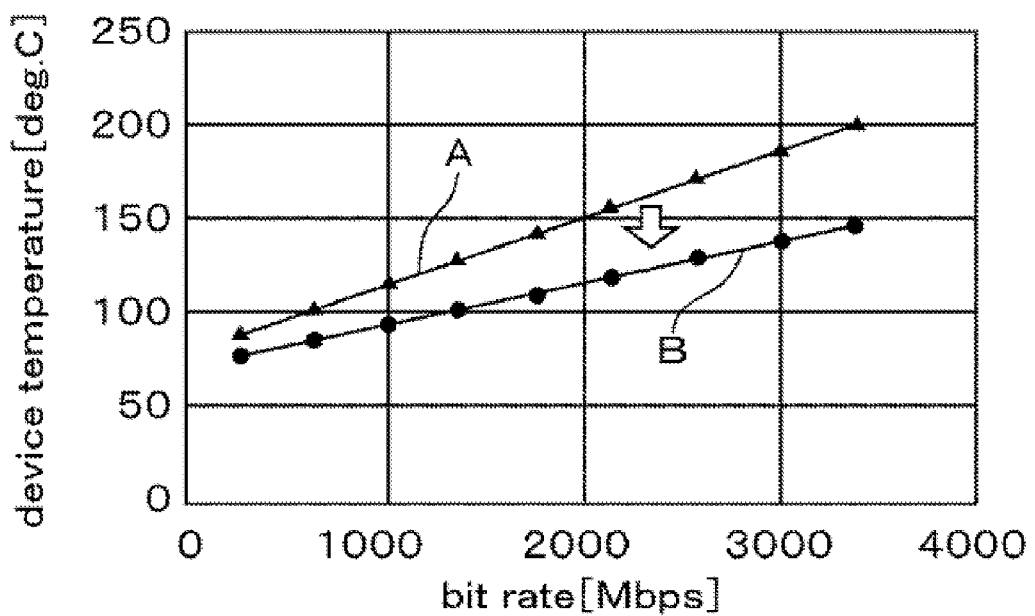
FIG. 6 is a plot showing a relationship between internal data-transfer rate and temperature of an arm-electronics (AE) module, also referred to herein as a recording/reproducing IC, of the HSA.

With reference now to FIGS. 5 and 6, with relevance to embodiments of the present invention, in FIG. 5, a cross-sectional view is shown that shows heat transfer, and thermal radiation, away from the HSA; and, in FIG. 6, a plot is shown that shows a relationship between internal data-transfer rate and temperature of AE module 2 of the HSA. In FIG. 6, AE module 2 is also referred to as a recording/reproducing IC. According to the first example, the intermediate conductor layer 106 is provided, which increases the amount of heat dissipation and transfer from AE module 2. As shown in FIG. 5, the metal layer 106 having high thermal conductivity is additionally provided as the intermediate conductor layer; and, thus, heat from AE module 2 is first diffused via the solder bumps 105 and the intermediate conductor layer 106; then, the heat is transferred to the metal plate 104 including aluminum under the resin layer 103; and, finally, the heat is transferred to the arm carriage 50 with cross-sectional area across which heat is transferred being wider than the back side of AE module 2. This accelerates heat dissipation and transfer from AE module 2. Furthermore, a position of an intermediate conductor layer 106, which is at a distance Da, is far from the solder connection position of FPC board 1 to the lead-suspension 3 compared with the distance Db between the connection terminals 100 and the metal plate 104. Therefore, an amount of heat for solder connection is hardly lost from the connection terminals, and thus, not substantially reduced, so that FPC board 1 may be connected by soldering to the lead-suspension 3, which provides a HSA including a structure where FPC board 1 is perpendicularly connected to the lead-suspension 3.

FIG. 6 shows a calculation result based on the inventors' measurement result regarding dependence of surface temperature of AE module 2, also referred to herein as a recording/reproducing integrated circuit (IC), on the internal data-transfer rate. In FIG. 6, line A shows the dependence of the surface temperature of the AE module of the structure of FIG. 16, previously known in the art, on the internal data-transfer rate; and, line B shows the dependence of surface temperature of AE module 2 of the structure in accordance with embodiments of the present invention on the internal data-transfer rate. For the structure, previously known in the art, when speed of operation of a preamp becomes higher, power consumption is increased due to an increase in the number of times of switching of an internal circuit, or an increase in the number of times of charge and discharge of each capacitance, and the quantity of heat generated by the preamp of the AE module is increased accordingly. In operation of the AE module, if the heat is not adequately dissipated, and temperature of the preamp remains high, an internal element may become deformed, leading to degradation in performance of the preamp. In accordance with embodiments of the present invention, such heat from the preamp is diffused to the metal plate 104 having large area and high thermal conductivity to be dissipated. However, if a reinforcing substrate, being low in thermal conductivity and greater in thickness, for example, the resin layer 103, is disposed between the preamp and the metal plate, heat transfer to the metal plate 104 may be inhibited and, therefore, inadequately dissipated; consequently, the temperature of the preamp may tend to become increased.

The heat generated by AE module 2 diffuses away in various directions, for example, into the air surrounding AE module 2, and to the transmission lines 10 and to the transmission lines 11. However, a dominantly large amount of heat with respect to heat dissipation and transfer from AE module 2 is transferred to the metal plate 104 that is disposed close to AE module 2, affixed to the arm carriage 50 and coupled with the actuator arm 5 via the arm carriage 50, which is also attached to the actuator arms, and the DE 9, being metal members that have high thermal conductivity and high heat capacity. Therefore, in accordance with embodiments of the present invention, a comparison was made of the heat transfer effect using transferability of heat from AE module 2 to the metal plate 104 as an index.

First, in the structure of FIG. 16, previously known in the art, the following are defined: an area in a planar shape of the AE module 2 of FIG. 16 is $S_1$; thermal resistivity of polyimide, or alternatively, the adhesive is $\rho$; a distance between AE module 2 and the metal plate 104 is $L_1$; and, thermal resistance between AE module 2 of FIG. 16 and the metal plate 104 is $R_1$. Moreover, in the first example (FIG. 3), the following are defined: an area in a planar shape of the intermediate conductor layer 106 is $S_2$; a distance between AE module 2 of FIG. 3 and the layer 106 is $L_2$; a distance between the layer 106 and the metal plate 104 is $L_3$; and, thermal resistivity between AE module 2 of FIG. 3 and the metal plate 104 is $R_2$. In this case, the thermal resistance $R_1$ between AE module 2 of FIG. 16 and the metal plate 104 in the structure, as previously known in the art, is expressed by formula (1); and, the thermal resistance $R_2$ between AE module 2 of FIG. 3 and the metal plate 104 in the first example, in an embodiment of the present invention, is expressed by formula (2).

$$R_1 = \rho \frac{L_1}{S_1} \tag{1}$$

$$R_1 = \rho \frac{L_2}{S_1} + \rho \frac{L_3}{S_2} \tag{2}$$

Calculations based on these formulae were performed based on assumptions that: the area $S_2$ of the intermediate conductor layer 106 is two times as large as the area of AE module 2; $L_2=0.2L_1$ and $L_3=0.8L_1$, which were substituted into the formula (2) based on a thickness dimension of each layer and a thickness dimension of the adhesive; and, a relationship of $R_2=0.6R_1$ was obtained. This shows that when area of the intermediate conductor layer 106 is two times as large as the area of AE module 2, thermal resistance to the transfer of heat from AE module 2 to the metal plate 104 is reduced by 40 percent in the first example, in an embodiment of the present invention, compared with the structure, and transferability of heat from AE module 2 to the metal plate 104, that is, an effect of dissipating heat from AE module 2 is improved by about 40 percent compared with the structure, as previously known in the art. In FIG. 6, line B shows the consequences of the above result when applied to the temperature of the AE module 2 of the first example, in an embodiment of the present invention.

The issue of degradation of a write signal and read-back signal caused by increased speed of the signal is next described. Degradation of the write signal and the read-back signal due to increased speed of the signal raises the issue that, when the HSA with the structure, as previously known in the art, is used, excessive overshoot and excessive undershoot occur in a write-signal current waveform, also referred to herein as a recording-signal current waveform, at a connection point of FPC board 1 to the lead-suspension 3.

An effect of reduced degradation of a write signal transmitted from AE module 2 to the magnetic-recording head was found upon comparing the structure of FIG. 16, as previously known in the art, with the structure of the first example, in an embodiment of the present invention. A simulation analysis result of an eye pattern of a write-signal current waveform observed at a test point at a magnetic-recording head of the HSA was used as a measure for comparison. A write signal outputted by AE module 2 has: a data-transfer rate of about 2 gigabits-per-second (Gbps), with a corresponding rise-time or fall-time of about 160 picoseconds (psec); a write-signal current of 40 milliamps (mA); and, an overshoot of 70 mA. The output impedance of the write circuit in AE module 2 is 60Ω. Characteristic impedance of a write-signal transmission lines of the transmission lines 30 on the lead-suspension 3 is 60Ω; a write coil in the magnetic-recording head is 3 nH and 5Ω; and, characteristic impedance of the write-signal transmission lines 108 on FPC board 1 with the structure of FIG. 16, as previously known in the art, is 100Ω.

Figure 7:
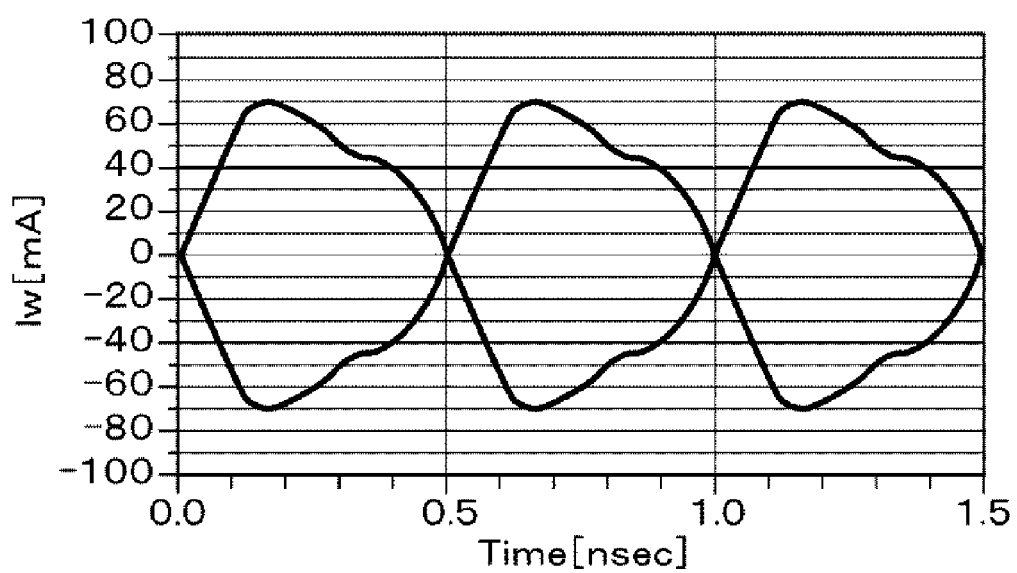
FIG. 7 is a graph illustrating a write-signal current waveform, also referred to herein as a recording-signal current waveform, outputted by an AE module.
Figure 8:
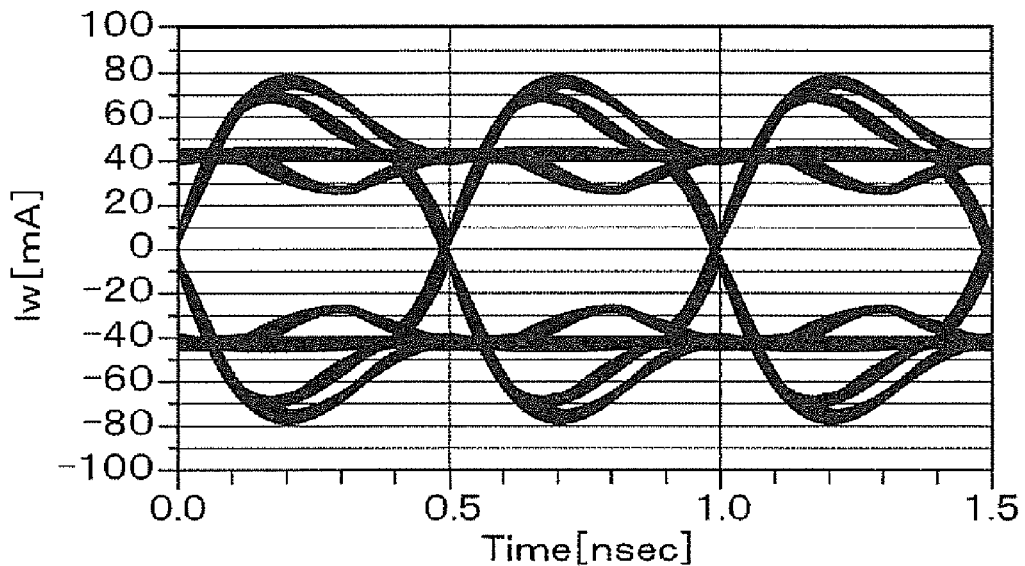
FIG. 8 is a graph illustrating a write-signal current waveform of a HSA, as previously known in the art.

With reference now to FIGS. 7 and 8, with relevance to embodiments of the present invention, a graph is shown that illustrates a write-signal current waveform outputted by AE module 2; and, in FIG. 8, an eye pattern is shown that illustrates the write-signal current waveform observed at a test point at the magnetic-recording head of the HSA, as previously known in the art. According to FIG. 8, excessive overshoot and excessive undershoot, which do not correspond to an output waveform of AE module 2 of FIG. 7, occur in a write-signal current waveform observed at a test point at the magnetic-recording head. The excessive overshoot and excessive undershoot cause an increase in pattern jitter of the write-signal current waveform, or may affect amplitude, or similar characteristics, of write-signal current for each subsequent bit. Particularly, the excessive overshoot raises an issue that the excessive overshoot may excessively increase magnetic field, which stimulates magnetization reversal of a magnetic-recording disk, generated by the write coil of the magnetic-recording head; and, the excessively increased magnetic field may cause magnetization reversal, not only in the written bit-cell, but also in a bit-cell adjacent to the written bit-cell in a track direction. In addition, excessive undershoot reduces intensity of the magnetic field stimulating magnetization reversal in a magnetic-recording disk; therefore, the excessive undershoot may cause recording of false data without inducing magnetization reversal consistent with the write signal. Such excessive overshoot and excessive undershoot are caused by characteristic impedance mismatching between components that configure the signal transmission system that transmits a write signal from the AE module 2 to the magnetic-recording head 4.

Figure 9A:
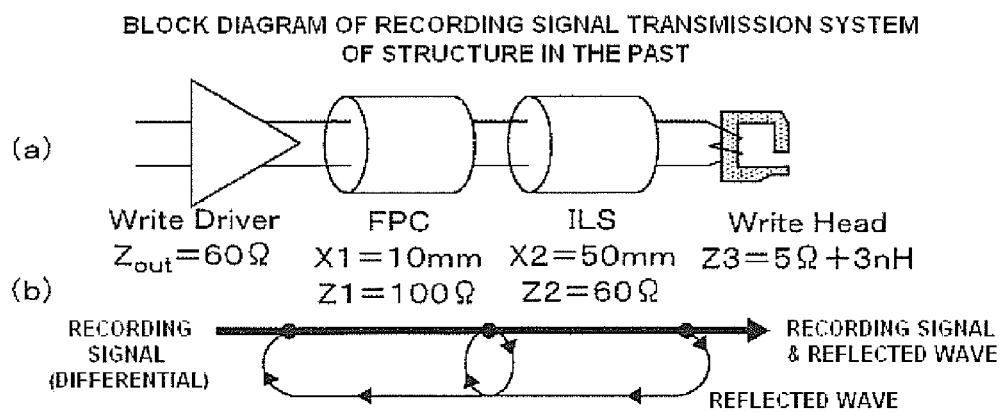
FIG. 9A is a block diagram showing a write-signal transmission system of the HSA, as previously known in the art.

With reference now to FIG. 9A, with relevance to embodiments of the present invention, a block diagram is shown that shows a write-signal transmission system, as previously known in the art according to FIG. 16. The write-signal transmission system includes AE module 2, the FPC board 1, the lead-suspension 3, and the magnetic-recording head 4. In FIG. 9A, Xn gives roughly length of each component indexed by various values of the index, n; and, Zn gives roughly differential characteristic impedance of each component indexed by various values of the index, n. In a write-signal transmission system of the HSA with the structure of FIG. 16, as previously known in the art, the distance T1 between the first conductor layer 10 and the metal plate 104 is 125 μm. While, output impedance of AE module 2 and characteristic impedance of the write-signal transmission lines on the lead-suspension 3 are 60Ω, respectively; only, the write-signal transmission lines 108 on FPC board 1 connecting AE module and the circuit board has a characteristic impedance of 100Ω. Thus, the write-signal transmission system is configured such that only one block of the system has a higher characteristic impedance. Generally, when current flows from a line having higher characteristic impedance into a line having lower characteristic impedance, a reflected current with reversed polarity and a passing current increased in amplitude are generated due to impedance mismatching. Conversely, when current flows from a line having lower characteristic impedance into a line having higher characteristic impedance, a reflected current with the same polarity and a passing current decreased in amplitude are generated. This shows that in the HSA including the structure of FIG. 16, as previously known in the art, when a write-signal current flows from the write-signal transmission lines 108 on FPC board 1 into the write-signal transmission lines 30 on the lead-suspension 3, the reflected current with reversed polarity is generated from the write-signal current; and, the reflected current is returned to AE module 2 and further reflected by AE module 2 with polarity being reversed, and added to the original write-signal current. This causes an overshoot waveform, in addition to an original overshoot waveform, in the write-signal current waveform at a connection point of FPC board 1 to the lead-suspension 3, with a delay from the original overshoot waveform by a time for sending and return of current through the write-signal transmission lines 108. The write-signal current is reflected with polarity being reversed even by a write coil in the magnetic-recording head; and, when the current flows from the lead-suspension 3 into FPC board 1, the current is further reflected with polarity unchanged, such that the current is added to the original write-signal current with polarity reversed to polarity of the write-signal current. Thus, an undershoot waveform appears in a write-signal current waveform at a test point at the magnetic-recording head while being delayed from an original overshoot waveform by the time for sending and return of a current through the write-signal transmission lines 30 on the lead-suspension 3. Each of the excessive overshoot and the excessive undershoot appears while being delayed by time t from an original overshoot waveform, the time t being obtained from formula (3):

$$t = X \frac{\sqrt{e_{\mathit{eff}}}}{c} \qquad (3)$$

where X is total length of a write-signal transmission system (Xn); $e_{\mathit{eff}}$ is an effective dielectric constant of a line; and, c is velocity of light in a vacuum.

Figure 9B:
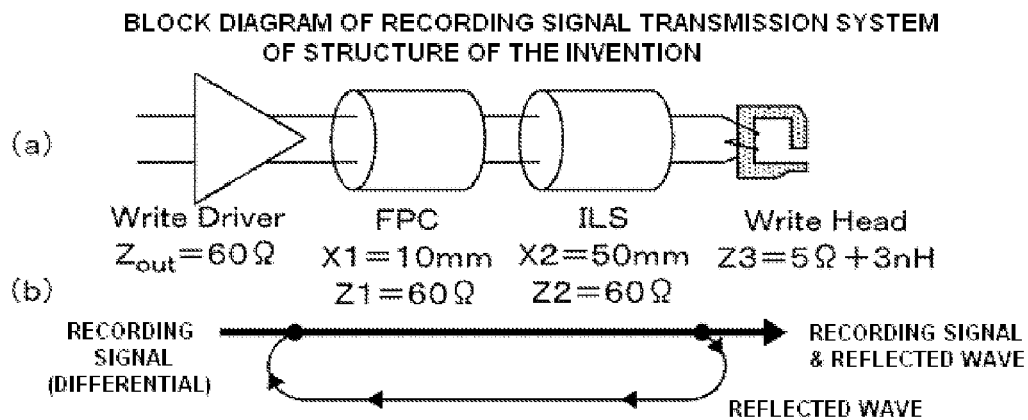
FIG. 9B is a block diagram showing a write-signal transmission system of the HSA of the first example, in accordance with an embodiment of the present invention.

With reference now to FIG. 9B, in accordance with embodiments of the present invention, a block diagram is shown that shows a write-signal transmission system. In the write-signal transmission system of HSA of the first example, in an embodiment of the present invention, a distance between the first conductor layer 10 and the intermediate conductor layer 106, in other words, thickness ($T_0$) of the first insulating layer 102 is 25 μm. Characteristic impedance of about 60Ω of the write-signal transmission lines 108 on FPC board 1 may be provided by using such a configuration.

According to the first example, in an embodiment of the present invention, when the write-signal transmission lines 108 on FPC board 1 and the write-signal transmission lines 30 on the lead-suspension 3 have an effective dielectric constant of 3.5, respectively, overshoot caused by reflection occurs in a write-signal current waveform while being delayed by 125 psec from an original overshoot waveform; and, undershoot occurs while being delayed by 624 psec from the original overshoot waveform.

Figure 10:
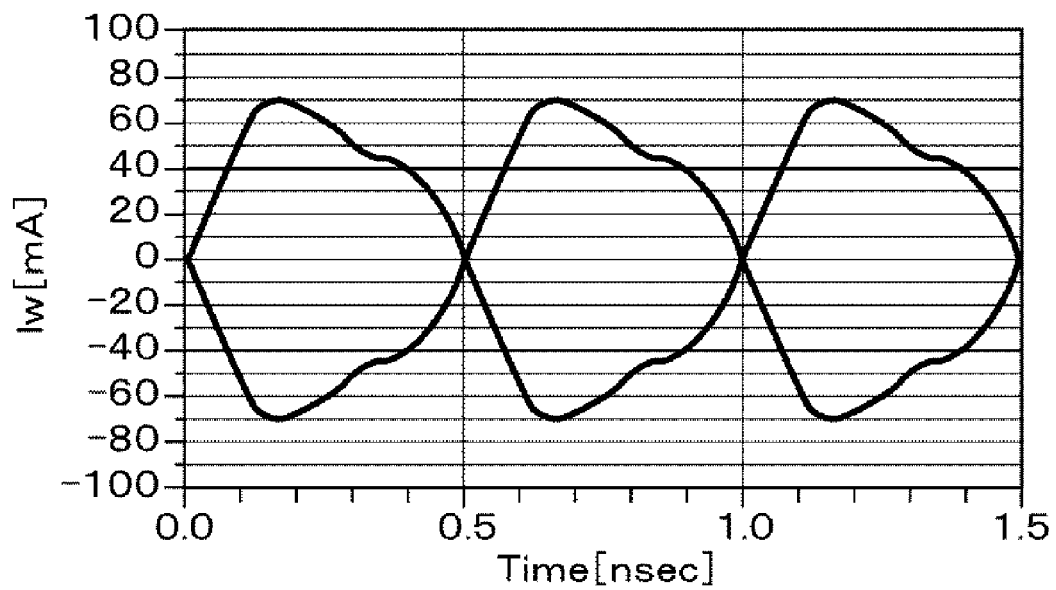
FIG. 10 is a graph illustrating a write-signal current waveform of the HSA of the first example, in accordance with an embodiment of the present invention.

With reference now to FIG. 10, in accordance with embodiments of the present invention, an eye pattern is shown that illustrates a write-signal current waveform at a test point at the magnetic-recording head of the HSA of the first example. According to FIG. 10, a write-signal current waveform observed at the test point corresponds well with the waveform of FIG. 7 outputted by AE module 2.

Thus, according to the HSA of the first example, in an embodiment of the present invention, a characteristic impedance of about 60Ω of the write-signal transmission lines 108 on FPC board 1 is provided; and, impedance matching is established between AE module 2 and the write-signal transmission lines on the lead-suspension 3. Thus, a write-signal current is transmitted from AE module 2 to the magnetic-recording head without reflection; and, moreover, a current reflected by the write coil in the magnetic-recording head is returned to AE module 2 without reflection. Therefore, a write-signal current waveform outputted by AE module 2, which is the intended write-signal current waveform for data recording, is transmitted to the magnetic-recording head without degradation.

According to the first example, in an embodiment of the present invention, a reflected wave caused by characteristic impedance mismatching may be reduced even in high speed transmission of a write signal, so that degradation of a write signal may be reduced. In addition, heat generated by AE module 2 tends to be diffused to the intermediate conductor layer disposed near AE module 2 by thickness of the resin layer compared with the metal plate. Moreover, heat diffused to the intermediate conductor layer may be transmitted to the metal plate, the actuator arm, and the DE with the area for heat transfer being larger than the area of AE module 2, so that heat dissipation from AE module 2 may be increased; and, consequently, an increase in temperature of AE module 2 may be reduced.

EXAMPLE 2

Figure 11:
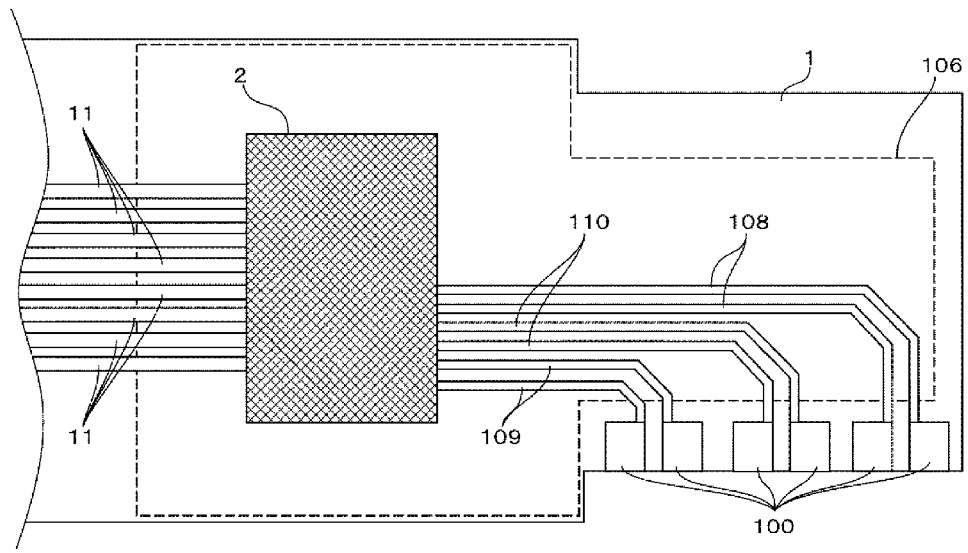
FIG. 11 is a plan view illustrating a FPC board of a second example, in accordance with an embodiment of the present invention.

With reference now to FIG. 11, in accordance with an embodiment of the present invention, a plan view is shown of a FPC board 1 according to a second example. In each of the following examples, a longitudinal section of the FPC board 1 has a configuration that is the same as the basic configuration shown in FIG. 3B or 3C, or has a partially modified configuration of the basic configuration; therefore, views of longitudinal sections are omitted from FIGS. 11-15 used to describe the following alternative examples. In the second example, heater lines 110 is disposed between the write-signal transmission lines 108 and the read-back-signal transmission lines 109 on the FPC board 1 in addition to the configuration of the first example, the heater lines 110 transmitting a signal from the AE module 2 to a heater element (not shown) in the magnetic-recording head 4 so as to control a fly height of the magnetic-recording head 4. In accordance with an embodiment of the present invention, the intermediate conductor layer 106 has a width at least equal to, or larger than, a width of each of the transmission lines 108, 110 and 109 directly below the respective lines.

EXAMPLE 3

Figure 12:
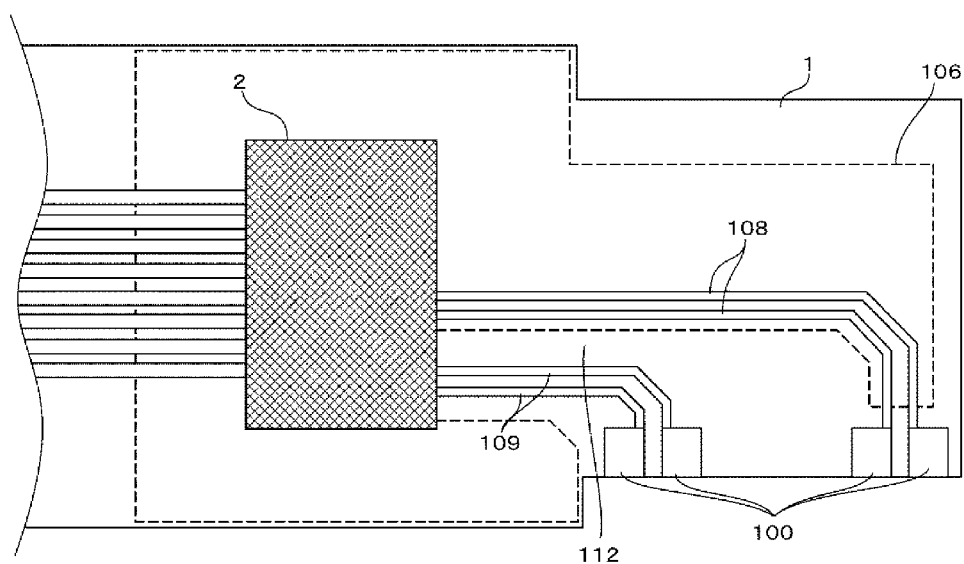
FIG. 12 is a plan view illustrating a FPC board of a third example, in accordance with an embodiment of the present invention.

With reference now to FIG. 12, in accordance with an embodiment of the present invention, a plan view is shown of a FPC board 1 according to a third example. Embodiments of the present invention include: (1) an intermediate conductor layer that is disposed extending across write-signal transmission lines 108 including a differential structure; and, (2) an intermediate conductor layer 106 such that the total of area of the intermediate conductor layer 106 below the AE module 2 and area of the intermediate conductor layer 106 below the write-signal transmission lines 108 is at least equal to, or larger than, a bottom area of the AE module 2.

In the third example of FIG. 12, write-signal transmission lines 108 and read-back-signal transmission lines 109 are disposed on FPC board 1; and, an intermediate conductor layer 106 is disposed only below the AE module 2 and the write-signal transmission lines 108, and not disposed below the read-back-signal transmission lines 109. In accordance with an embodiment of the present invention, the intermediate conductor layer 106 has a width at least equal to, or larger than, a width of the write-signal transmission lines 108 directly below the write-signal transmission lines 108.

According to the third example, in accordance with an embodiment of the present invention, while an effect of reducing an increase in temperature of the AE module is reduced, an effect of reducing degradation of a write signal is adequately provided.

EXAMPLE 4

Figure 13:
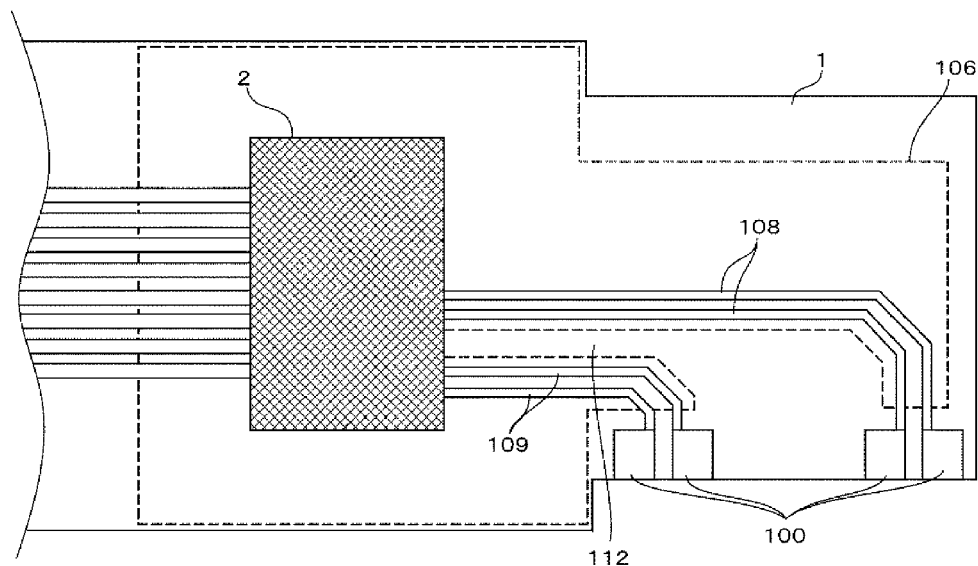
FIG. 13 is a plan view illustrating a FPC board of a fourth example, in accordance with an embodiment of the present invention.

With reference now to FIG. 13, in accordance with yet another embodiment of the present invention, a plan view is shown of a FPC board 1 according to a fourth example. In the fourth example, write-signal transmission lines 108 and read-back-signal transmission lines 109 are disposed on FPC board 1, and an intermediate conductor layer 106 includes a cut 107 between the intermediate conductor layer 106 directly below the write-signal transmission lines 108 and the intermediate conductor layer 106 directly below the read-back-signal transmission lines 109. In accordance with an embodiment of the present invention, this provides an effect that crosstalk between the write-signal transmission lines 108 and the read-back-signal transmission lines 109 on FPC board 1, which is associated with crosstalk in AE module 2, may be reduced.

EXAMPLE 5

Figure 14:
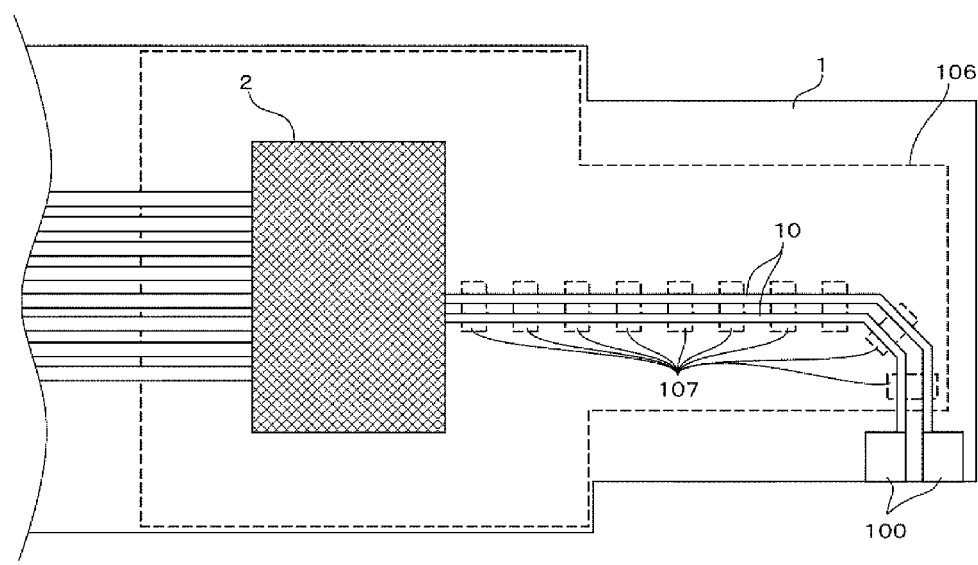
FIG. 14 is a plan view illustrating a FPC board of a fifth example, in accordance with an embodiment of the present invention.

With reference now to FIG. 14, in accordance with yet another embodiment of the present invention, a plan view is shown of a FPC board 1 according to a fifth example. In the fifth example, an intermediate conductor layer 106 includes periodic holes 107 on FPC board 1 on which transmission lines 10 configured to transmit a write signal and a read-back signal are disposed. In accordance with an embodiment of the present invention, each of the holes 107 are periodically disposed with a fixed size and a certain interval from a starting point to an end point of the transmission lines 10 in the intermediate conductor layer 106 directly below the transmission lines 10; and, each hole has: a width larger than a width of the transmission lines 10; a length of at least 50 μm, or more, in the same direction as a longitudinal direction of the transmission lines 10; and, an interval between holes which is at least 50 μm, or more. The length of, and interval between, the holes 107 are controlled; and, thus, transmission lines 10 that possess suitable characteristic impedance may be obtained without changing an interval between the transmission lines 10 and the intermediate conductor layer 106, namely, the thickness of the base insulating layer 102 (refer to FIG. 3B) of FPC board 1.

EXAMPLE 6

Figure 15:
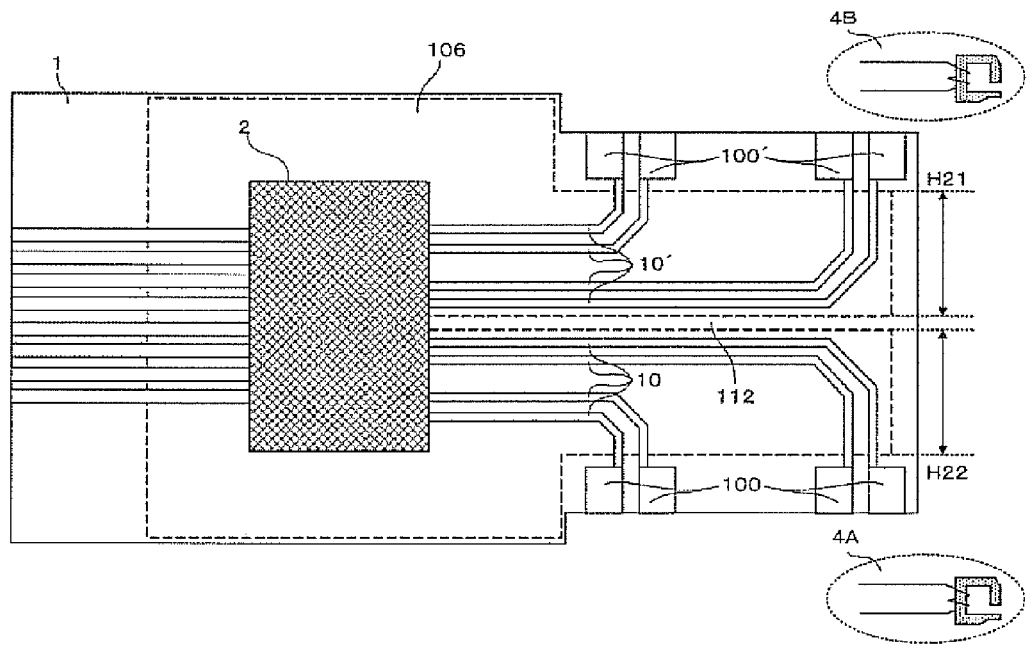
FIG. 15 is a plan view illustrating a FPC board of a sixth example, in accordance with an embodiment of the present invention.

With reference now to FIG. 15, in accordance with yet another embodiment of the present invention, a plan view is shown of a FPC board 1 according to a sixth example. The sixth example shows FPC board 1 in a case in which two lead-suspensions 3 (refer to FIG. 1) are connected to FPC board 1. In accordance with an embodiment of the present invention, a lead-suspension including a magnetic-recording head 4A, which is assumed as lead-suspension A for illustration, is connected to the FPC board 1 on a lower side in the figure; and, another lead-suspension including a magnetic-recording head 4B, which is assumed as lead-suspension B for illustration, is connected to the FPC board 1 on an upper side in the figure. Transmission lines 10 including at least two lines electrically connected to the lead-suspension A, and connection terminals 100 of the transmission lines 10, and transmission lines 10' including at least two lines electrically connected to the lead-suspension B, and connection terminals 100' of the transmission lines 10' are disposed on FPC board 1. A cut is disposed between the intermediate conductor layer 106 below the transmission lines 10 and the intermediate conductor layer 106 below the transmission lines 10'. In accordance with an embodiment of the present invention, this may reduce crosstalk between the transmission lines 10 and the transmission lines 10', namely, crosstalk between adjacent channels.

In accordance with an embodiment of the present invention, the number of lead-suspensions to be connected to FPC board 1 may also be three, or more. For example, a multistage configuration may be formed, where downward connection terminals and a corresponding third magnetic-recording head are disposed on an upper side of the magnetic-recording head 4B in FIG. 15; and, other downward connection terminals and a corresponding fourth magnetic-recording head are further disposed on an upper side of the third magnetic-recording head. In this case, in accordance with an embodiment of the present invention, transmission lines 10 and connection terminals 100 corresponding to the number of the lead-suspensions are disposed in multi-levels on FPC board 1; and, an intermediate conductor layer 106 corresponding to transmission lines 10 in each stage includes a cut between respective channels.

In accordance with an embodiment of the present invention, the sixth example has an effect of providing a HSA with reduced degradation of a write signal transmitted to a magnetic-recording head, and reduced degradation in performance of the AE module due to an increase in temperature of the AE module; and, thus, the HSA of the sixth example is suitable for high-speed data-transfer rates.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A head-stack assembly, comprising:
   a magnetic-recording head;
   a lead-suspension supporting said magnetic-recording head on an actuator arm;
   a metal plate coupled with said actuator arm,
   a resin layer disposed on said metal plate;
   a flexible-printed-circuit board being disposed on said resin layer, and substantially perpendicularly connected to said lead-suspension;
   an arm-electronics module disposed on said flexible-printed-circuit board configured to shape a write-signal current waveform of a write signal to said magnetic-recording head;
   transmission lines disposed on said flexible-printed-circuit board configured to transmit said write signal to, and a read-back signal from, said lead-suspension; and
   a single intermediate conductor layer that is disposed between said resin layer and said flexible-printed-circuit board, and having a planar shape substantially facing a bottom of said arm-electronics module and a bottom of said transmission lines.

2. The head-stack assembly of claim 1, wherein an area of said intermediate conductor layer located below said arm-electronics module is larger than an area of said bottom of said arm-electronics module.

3. The head-stack assembly of claim 2, wherein a width of said intermediate conductor layer located below said transmission lines is at least equal a width of said transmission lines.

4. The head-stack assembly of claim 3, wherein a connection point of said flexible-printed-circuit board to said lead-suspension is separated from said metal plate by a space; and, a distance between said connection point of said flexible-printed-circuit board to said lead-suspension and said intermediate conductor layer is longer than a length of said space.

5. The head-stack assembly of claim 4, wherein said length of said space, and a distance between said connection point of said flexible-printed-circuit board to said lead-suspension and said metal plate are longer than a distance between said arm-electronics module and said metal plate.

6. The head-stack assembly of claim 1, wherein said intermediate conductor layer is disposed such that said intermediate conductor layer covers all of said bottom of said transmission lines, all of said bottom of said arm-electronics module and all of a periphery of said bottom of said arm-electronics module.

7. The head-stack assembly of claim 1, wherein said flexible-printed-circuit board comprises connection terminals of said transmission lines, and said connection terminals are connected by solder to said lead-suspension; said intermediate conductor layer is disposed such that said intermediate conductor layer covers all of said bottom of said transmission lines, all of said bottom of said arm-electronics module and all of a periphery of said bottom of said arm-electronics module; a connection point of said flexible-printed-circuit board to said lead-suspension is separated from said metal plate by a space; and, a length of said space, and a distance from said connection point to said intermediate conductor layer are longer than a distance between said arm-electronics module and said metal plate.

8. The head-stack assembly of claim 1, wherein a material of said intermediate conductor layer comprises a material selected from the group consisting of copper and rolled copper.

9. The head-stack assembly of claim 1, wherein an output impedance of said arm-electronics module, a characteristic impedance of write-signal transmission lines on said lead-suspension, and a characteristic impedance of write-signal transmission lines on said flexible-printed-circuit board connecting said arm-electronics module to said lead-suspension are substantially equal to one another.

10. The head-stack assembly of claim 9, wherein a distance between a conductor layer on said flexible-printed-circuit board and said intermediate conductor layer is selected to set said characteristic impedance of said write-signal transmission lines on said flexible-printed-circuit board to a value substantially equal to a value of said characteristic impedance of write-signal transmission lines on said lead-suspension.

11. The head-stack assembly of claim 1, wherein said transmission lines comprise write-signal transmission lines and read-back-signal transmission lines; and said head-stack assembly comprises:
a heater element disposed in said magnetic-recording head; and
heater lines disposed on said flexible-printed-circuit board configured to transmit a signal from said arm-electronics module to said heater element so as to control fly height of said magnetic-recording head; and
wherein said intermediate conductor layer has a width at least equal to a width of said write-signal transmission lines, a width of said heater lines, and a width of said read-back-signal transmission lines directly below said respective lines.

12. A head-stack assembly, comprising:
a lead-suspension supporting a magnetic-recording head on said actuator arm,
a metal plate coupled with said actuator arm,
an insulating layer disposed on said metal plate,
a flexible-printed-circuit board being disposed on said insulating layer, and substantially perpendicularly connected by solder to said lead-suspension,
an arm-electronics module disposed on said flexible-printed-circuit board configured to shape a write-signal current waveform of a write signal to a magnetic-recording head,
transmission lines disposed on said flexible-printed-circuit board configured to transmit said write signal to, and a read-back signal from, said lead-suspension, and
a single intermediate conductor layer formed between said insulating layer and said flexible-printed-circuit board, and having a planar shape substantially facing a bottom of said arm-electronics module and a bottom of said transmission lines,
wherein a connection point of said solder connection to said lead-suspension is separated from said metal plate by a space.

13. The head-stack assembly of claim 12, wherein said transmission lines comprise write-signal transmission lines and read-back-signal transmission lines; and a width of said intermediate conductor layer located below said write-signal transmission lines is at least equal to a width of said write-signal transmission lines.

14. The head-stack assembly of claim 12; wherein said transmission lines comprise write-signal transmission lines and read-back-signal transmission lines; and a width of said intermediate conductor layer located below said write-signal transmission lines is at least equal to a width of said write-signal transmission lines, and a width of said intermediate conductor layer located below said read-back-signal transmission lines is at least equal to a width of said read-back-signal transmission lines.

15. The head-stack assembly of claim 12, wherein a length of said space is larger than a distance between said arm-electronics module and said metal plate.

16. The hard-disk drive of claim 12, wherein a plurality of periodical holes are provided in said intermediate conductor layer; said plurality of holes in said intermediate conductor layer are periodically arranged in a sequential array from a starting point to an end point of said transmission lines directly below said transmission lines in a same direction as a longitudinal direction of said transmission lines; and a hole of said plurality of holes has a width larger than a width of said transmission lines.

17. A hard-disk drive, comprising:
a head-stack assembly configured to support a magnetic-recording head, and configured to transmit a write signal and read-back signal between a signal-processing unit disposed outside a disk enclosure of said hard-disk drive and said magnetic-recording head, said head-stack assembly comprising:
a lead-suspension supporting said magnetic-recording head on said actuator arm,
a metal plate coupled with said actuator arm,
a resin layer disposed on said metal plate,
a flexible-printed-circuit board being disposed on said resin layer, and substantially perpendicularly connected to said lead-suspension,
an arm-electronics module disposed on said flexible-printed-circuit board configured to shape a write-signal current waveform of a write signal to said magnetic-recording head,
transmission lines disposed on said flexible-printed-circuit board configured to transmit said write signal to, and said read-back signal from, said lead-suspension,
a coil configured to rotate said actuator arm to perform positioning of said magnetic-recording head, and
a single intermediate conductor layer formed between said resin layer and said flexible-printed-circuit board, and having a planar shape substantially facing a bottom of said arm-electronics module and a bottom of said transmission lines.

18. The hard-disk drive of claim 17, wherein an output impedance of said arm-electronics module, a characteristic impedance of write-signal transmission lines on said lead-suspension, and a characteristic impedance of write-signal transmission lines on said flexible-printed-circuit board connecting said arm-electronics module to said lead-suspension are substantially equal to one another.

19. The hard-disk drive of claim 18, wherein a distance between a conductor layer on said flexible-printed-circuit board and said intermediate conductor layer is selected to set said characteristic impedance of said write-signal transmission lines on said flexible-printed-circuit board to a value substantially equal to a value of said characteristic impedance of write-signal transmission lines on said lead-suspension.

20. The hard-disk drive of claim 17, further comprising:
a plurality of lead-suspensions disposed on said flexible-printed-circuit board to shape a plurality of write signals to, and a plurality of read-back signals from, a plurality of respective magnetic-recording heads;
a plurality of transmission lines electrically connected to said plurality of respective lead-suspensions that are disposed on said flexible-printed-circuit board; and
said single intermediate conductor layer disposed between said resin layer and said flexible-printed-circuit board, and having a planar shape substantially facing a bottom of said arm-electronics module and a bottom of said plurality of transmission lines.

* * * * *